Sept. 15, 1959   D. W. FLOY   2,903,982
LIQUID FERTILIZER ATTACHMENT FOR CORN PLANTER
Filed June 26, 1956

Delbert W. Floy
INVENTOR.

BY *Clarence A. O'Brien*
*and Harvey B. Jackson*
Attorneys

United States Patent Office 2,903,982
Patented Sept. 15, 1959

2,903,982

LIQUID FERTILIZER ATTACHMENT FOR CORN PLANTER

Delbert W. Floy, near Sheffield, Iowa, assignor of twenty-five percent to Oscar Floy, Thornton, and fifty percent to Ris-Van, Inc., Belmont, Iowa, a corporation of Iowa Application June 26, 1956, Serial No. 593,993

1 Claim. (Cl. 111—7)

This invention relates to the class of agricultural equipment and more particularly to a novel fertilizer attachment for corn planters and the like.

The primary object of the present invention resides in the provision of means for distributing in the soil liquid fertilizer at the same time corn or other seed is planted. The present invention is adapted to place liquid fertilizer in a band approximately one inch below the seed at the time of planting.

The construction of this invention features a jet pipe which is attached to a supply hose, which supply hose is attached to a tank containing liquid fertilizer. The pipe is then projected through or into a corn planter runner and is adapted to apply a stream of liquid fertilizer at the same time corn is planted.

A further object of the present invention resides in the provision of novel means for supporting a jet pipe with respect to a corn planter runner.

Still further objects and features of this invention reside in the provision of a fertilizer attachment for corn planters or the like which is simple in construction, easy to install on various existing makes and models of conventional corn planters, yet which may be readily adapted for factory installation, and which is inexpensive to produce thereby permitting wide use and distribution.

These, together with the various ancillary objects and features of the invention which will become apparent as the following description proceeds, are attained by this fertilizer attachment for corn planters, a preferred embodiment of which has been illustrated in the accompanying drawings, by way of example only, wherein.

Figure 1:
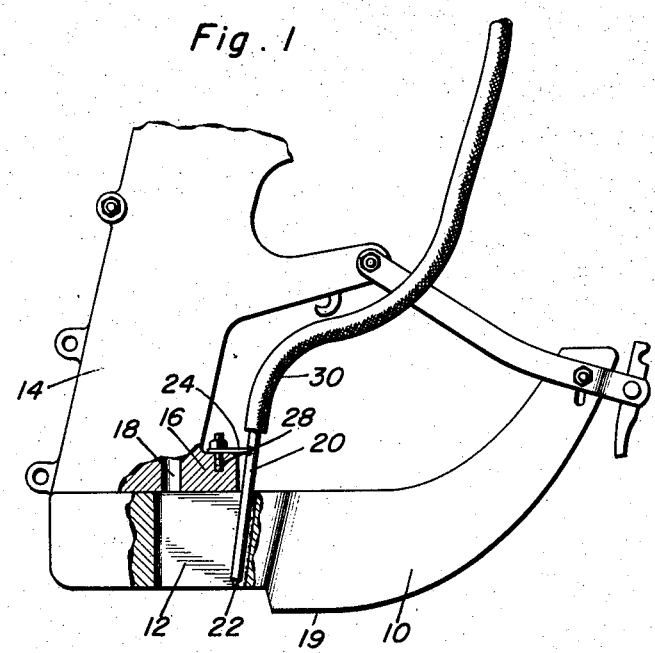
Figure 1 is a side elevational view of the fertilizer attachment as shown in conjunction with a corn planter runner with parts of the runner and support therefor being broken away to show the mounting of the invention in detail.
Figure 2:
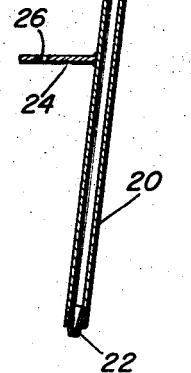
Figure 2 is an enlarged sectional detail view of the attachment illustrating the manner of attachment of the liquid fertilizer delivery conduit thereto.
Figure 3:
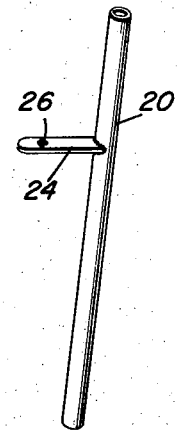
Figure 3 is a perspective view of the jet pipe and associated bracket.

With continuing reference to the accompanying drawings wherein like reference numerals designate similar parts throughout the various views, reference numeral 10 generally designates a corn planter runner of conventional construction which is provided with a vertically extending opening 12 extending therethrough. The runner 10 is supported by a suitable and conventional support 14 provided with a portion 16 extending into overlying position with respect to a portion of the opening 12. The support 14 has a passageway or conduit 18 therethrough through which corn seed or the like may pass so as to allow the corn seed to be deposited in the ground behind the furrow forming portion 19 of the runner 10.

The attachment which comprises the present invention includes a jet pipe 20 having threadedly secured therein at the end a jet 22 of greatly restricted cross-sectional area which jet 22 is adapted to direct the flow of fluid fertilizer into the ground and thus cause some of the fertilizer to be disposed beneath the corn when the corn is planted. This is highly desirable for fertilizing the roots of the young corn plants.

Secured to the jet pipe 20 as by soldering, welding, or other means or alternatively integrally formed therewith is a bracket 24 having an aperture 26 therethrough through which a bolt 28 extends. The bolt 28 is adapted to threadedly secure the bracket 24 and hence the jet pipe 20 to the portion 16 of the support 14. A flexible conduit 30 is connected to the jet pipe 20 and is connected to a suitable reservoir of liquid fertilizer, not shown, which is either fed by gravity or under pressure through the conduit 30 and out of the jet end 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a corn planter, an elongate generally vertically extending runner support having a substantially horizontal lower end face, a horizontal runner having a flat upper face at its rear portion engaging and secured to said lower end face of the runner support and projecting forwardly therefrom to terminate in an upwardly curved forward end portion, said rear portion of the runner having a vertical opening therethrough underlying the forward portion of said lower end face of the runner support and extending slightly therebeyond to present an access opening immediately forward of said runner support, said runner support having a vertically extending seed delivery passageway therein communicating with said opening in the runner at the rear side thereof, an elongate, tubular liquid fertilizer applicator secured to said runner support and projecting through said access opening so as to be positioned forwardly of and below the seed delivery passageway in the runner support, and a flexible fertilizer tube delivered to the upper end of said applicator, said applicator being in the form of a rigid metallic tube having a nozzle element detachably secured to the lower end thereof and being provided with a rigid, laterally projecting ear by means of which the applicator is secured to the runner support, the lower end of said applicator being positioned substantially at the lower extremity of said vertical opening in the runner for applying liquid fertilizer directly into the soil.

(References on following page)

References Cited in the file of this patent

UNITED STATES PATENTS

| | | |
|---|---|---|
| 46,523 | Doubler | Feb. 21, 1865 |
| 1,103,357 | Gilroy | July 14, 1914 |
| 1,229,604 | Garst | June 12, 1917 |
| 2,001,003 | Tuft | May 14, 1935 |
| 2,159,652 | Brunner | May 23, 1939 |
| 2,225,521 | Holveck | Dec. 17, 1940 |
| 2,509,627 | Bickerton | May 30, 1950 |
| 2,623,483 | Stevenson | Dec. 30, 1952 |
| 2,722,902 | Hyatt | Nov. 8, 1955 |
| 2,768,591 | James | Oct. 30, 1956 |

FOREIGN PATENTS

| | | |
|---|---|---|
| 23,036/29 | Australia | Mar. 28, 1930 |